June 24, 1930.  H. A. STRAIN  1,766,267
GAS WASHER
Filed Oct. 6, 1927   3 Sheets-Sheet 1
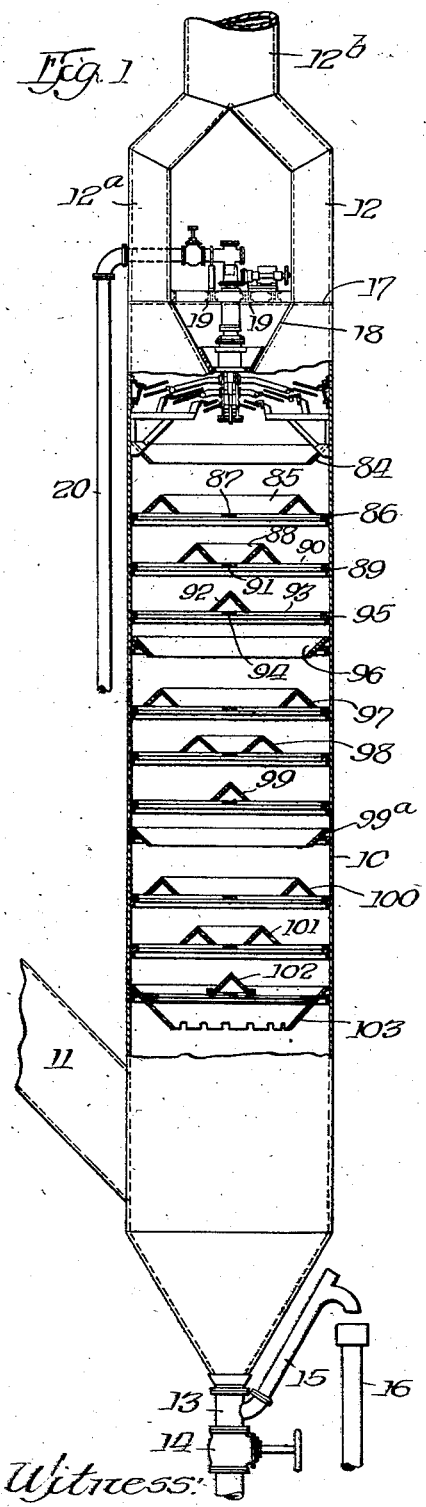
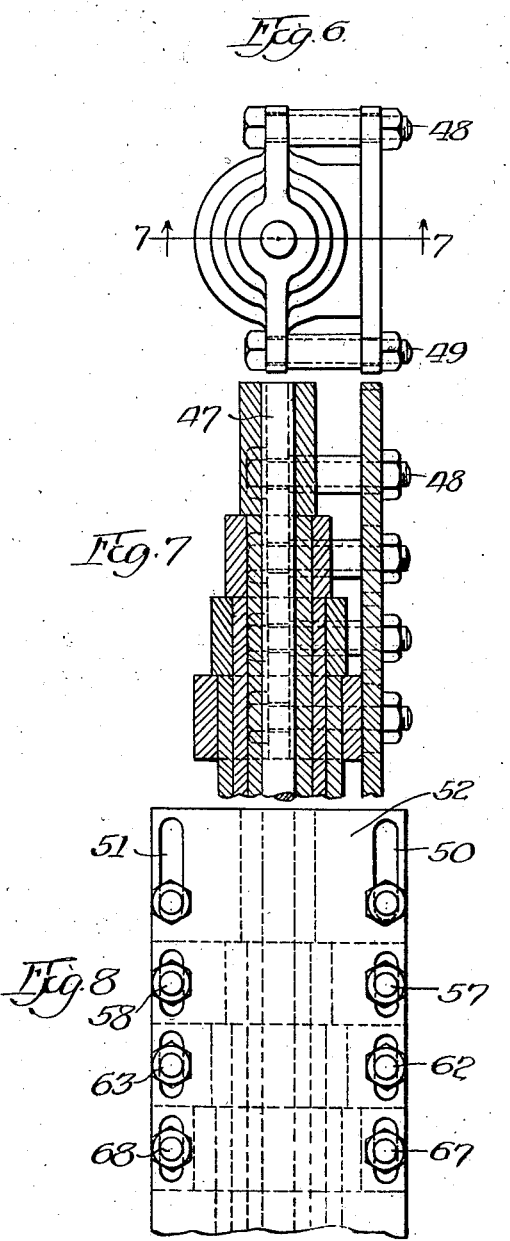
Inventor
Harry A. Strain

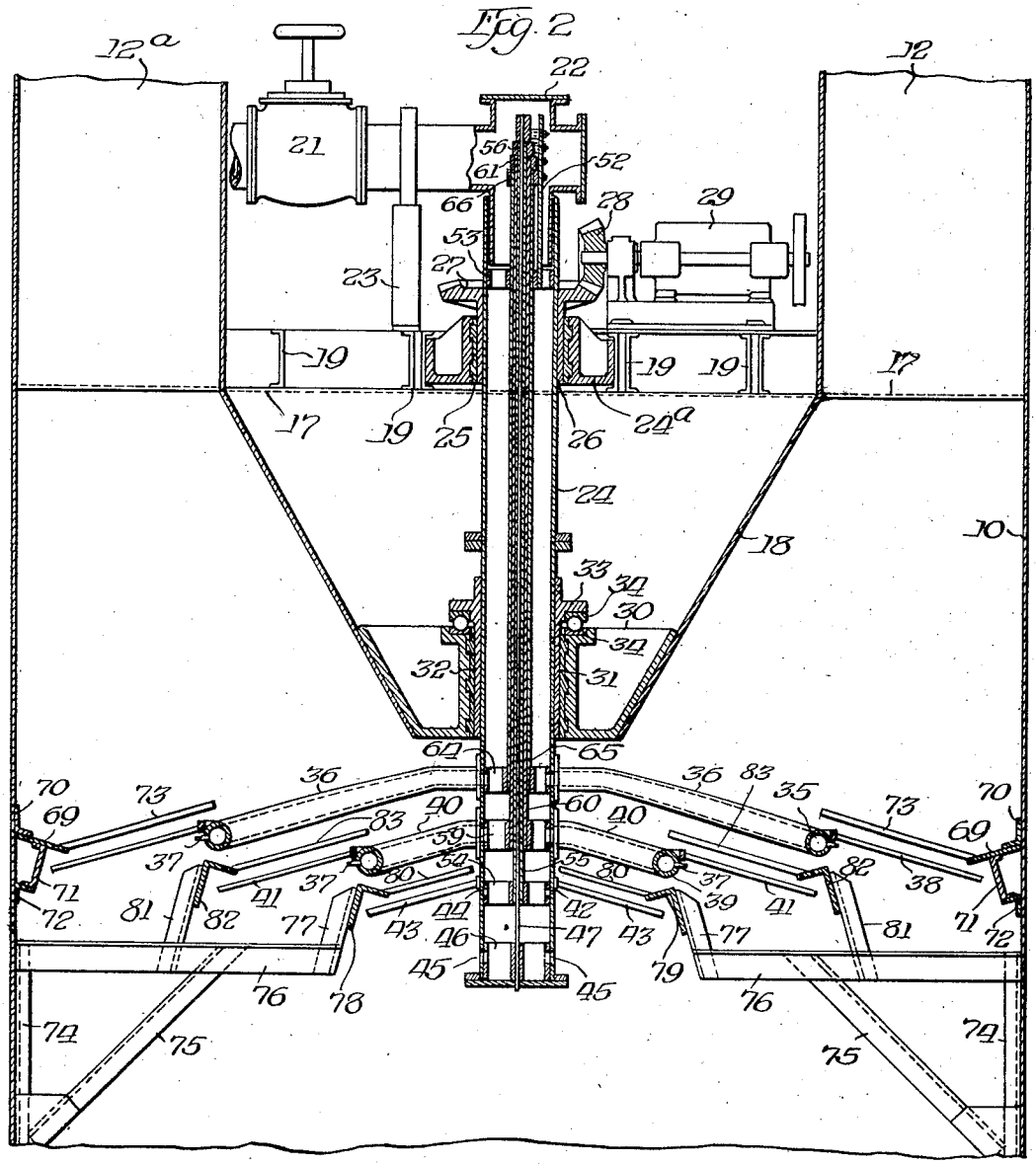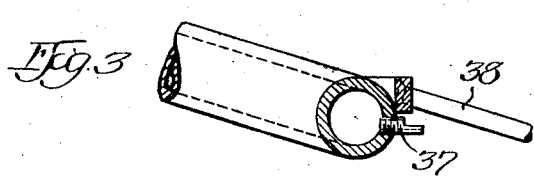

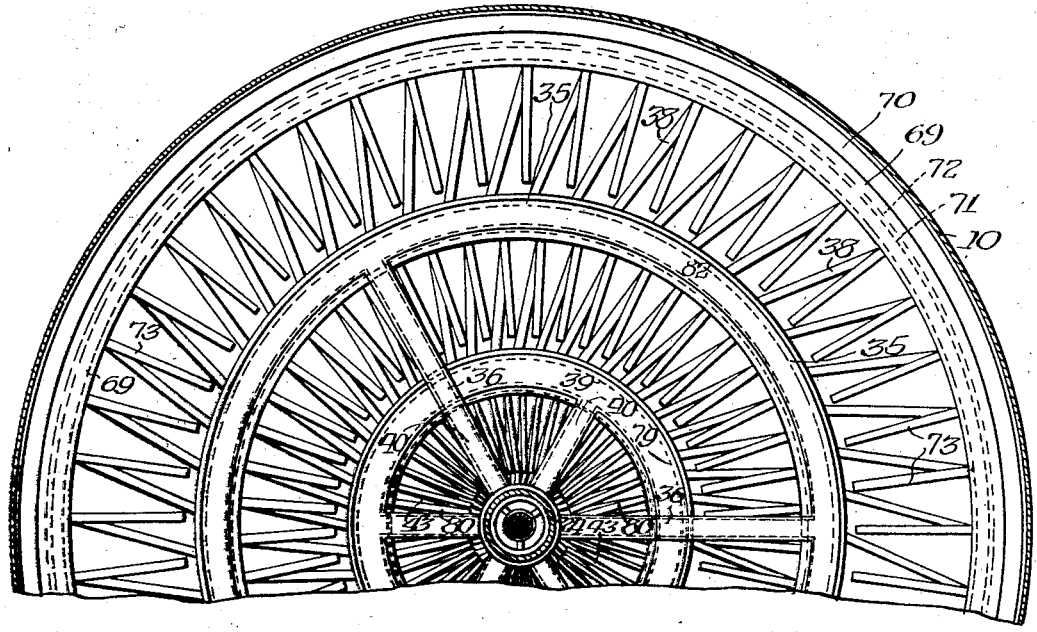
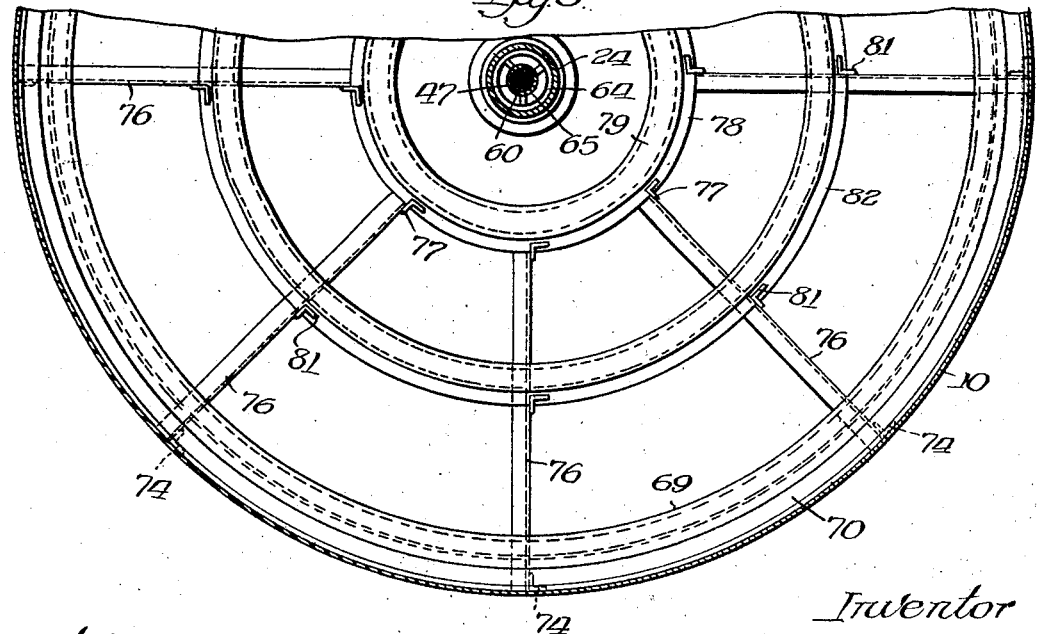

Patented June 24, 1930

1,766,267

UNITED STATES PATENT OFFICE

HARRY A. STRAIN, OF CHICAGO, ILLINOIS

GAS WASHER

Application filed October 6, 1927. Serial No. 224,407.

My invention relates to gas washers and has particular reference to a gas washer used in connection with the operation of blast furnaces for removing the dirt from the gas produced by the blast furnaces.

One object of my invention is the provision of a gas washer in which a stationary tower is employed having means therein for bringing the gas into contact with water introduced at the top of the tower and in addition thereto employs a means for breaking up the gas waves and also to divide the water into spray of mist-like form, thereby bringing the gas and water into intimate contact with each other whereby the particles of dirt are entrained and removed from the gas.

Another object of my invention is the provision of a gas washer having a beater arrangement incorporated therein by means of which waves or surges of gas in the form of large bubbles which pass upward through the tower are broken up which prevents the gas from channeling, thereby enabling the gas and water to be brought into more intimate contact with each other than has been possible heretofore, and also keeps the gas evenly distributed throughout the gas washer tower.

Gas washers for the purpose of cleaning blast furnace gas have been divided into two classes; viz., stationary and mechanical. The stationary type is comparatively cheap in operation and produces and eliminates to a very great extent solid matter carried by the gas, but in the economical operation of a blast furnace plant it is found desirable to clean the gas beyond a point which has been possible with the stationary type of cleaner. The mechanical washers, however, are more expensive to operate than the stationary washers, and while it is possible to more thoroughly clean the gas with the mechanical type of washer, its expense of operation and maintenance have in a large measure prohibited its use. This has been especially true with respect to the bearings into which particles of dust and dirt pass, resulting in cutting out the bearings in a short period of time.

These and other objects of my invention will be more fully and better understood by reference to the accompanying sheets of drawings, and in which—

Figure 1 is a vertical sectional view through a gas washer tower embodying my invention;

Figure 2 is a detail view partially in elevation and partially in section through the upper part of the tower, illustrating the beater and spray arrangement of the tower;

Figure 3 is a detail view showing the means for securing the paddles to the rotating water distributors;

Figure 4 is a partial cross sectional view through the washer tower above the beating and spray arrangement;

Figure 5 is a partial cross sectional view with the beater and spray arrangement removed;

Figure 6 is a top plan view of the mechanism employed for controlling the water valves;

Figure 7 is a vertical sectional view of the arrangement illustrated in Figure 6; and Figure 8 is an elevational view of the apparatus illustrated in Figure 7.

Referring now specifically to the drawings, a vertical gas washer shell 10 is shown having an inlet pipe 11 secured thereto at its lower end and a pair of outlet pipes 12 and 12$^a$ at the upper end thereof, connected to a single outlet pipe 12$^b$ with a water outlet pipe 13 having a valve 14 thereon positioned at the lower end of the shell 10 with a drain pipe 15 connected to the pipe 13 leading to a drain 16 for the purpose of carrying away the water flowing out of the pipe 15. In normal operation of the device the valve 14 is closed so that the water collects in the bottom of the shell 10 and forms a water seal to prevent the gas from passing out of the water discharge pipes at the bottom of the shell.

At the upper end of the shell 10, I provide a cover 17 below which a container 18 projects which is in the form of an inverted truncated cone which is secured to the cover 17 in any suitable manner, and is supported by a plurality of beams 19, 19 extending transversely of the shell 10 and rest thereon at each of their ends and support the beating arrangement hereinafter described.

A water supply pipe 20 is provided having a valve 21 located therein which leads to a T 22, the inner end of the pipe and T being supported by a member 23 mounted upon one of the structural supports 19. The member 18 forms a complete enclosure for the operating parts for the mechanical whirler or beater, thus preventing dirt from the gas and water from lodging in the bearings and causing them to be cut out and destroyed in a short time. The beater and spray arrangement is made up of a hollow pipe 24, mounted in vertical position inside the member 17 and having its lower end projecting outward below the end of the portion 18 of the member 17. An upper bearing 24ª is provided for the pipe 24 which is secured to and supported by the structural members 19 in any approved manner and has the usual renewable babbitted bearing 25 positioned therein with a collar portion 26 of a bevel gear wheel 27 extending downward along the pipe 24 and forming a bearing in engagement with the Babbitt bearing 25. The bevel gear 27 has a second bevel gear 28 in engagement therewith, which is mounted upon a motor shaft from a motor 29, which is mounted upon the structural members 19, 19. To the lower portion of the member 18 is secured a truncated cone member 30, within which a vertical bearing 31 is positioned, with a second bearing 32, being secured to the pipe 24 and having an outwardly projecting flange within which an upper ball race 34 is positioned with a lower ball race 35 being mounted in the member 30 with the usual ball bearings positioned between these races and serving to support the beater and spray mechanism. This bearing is kept supplied with a proper lubricant which forms a seal against the escape of the gas into the housing 17.

Attached to the lower end of the pipe 24 are the beating and spray members, this arrangement comprising an outer circular pipe 35, which is secured to the pipe 24 by a plurality of hollow spokes 36, 36 through which water passes to the pipe 35. To the outer side of the pipe 35 is fixed a plurality of nozzles 37, 37, these nozzles having their upper portion cut away at the outer end thereof so that flat surfaces are formed, from which water passes in flat or sheet formation instead of a round stream. The nozzles 37, 37 are set at an angle to the radii of the tower in a direction parallel with the flow of water therefrom, thereby reducing the power necessary to rotate the beating arrangement.

Also secured to the pipe 35 and adjacent the upper marginal edge thereof is a plurality of paddles 38, 38 which project radially in a downward direction from the pipe 35 and also at an angle to the radii of the gas washer tower so that they will not throw the gas outward to such a great extent. Mounted upon the pipe 24 is an inner circular pipe 39 which is connected to the pipe 34 by hollow spokes 40, 40, this pipe having paddles 41, 41 extending radially therefrom in a downward direction and at an angle to the radii of the gas washer tower, in exactly the same manner as heretofore described with respect to the paddles 38, 38. The pipe 39 is less in diameter than the pipe 35. It is therefore spaced inwardly therefrom so that the space in the tower inward of the pipe 35 and to a point occupied by pipe 39 is covered with a spray of water thrown from the pipe 39 through nozzles 37, 37 placed upon the outer side of the pipe 39 and project outwardly therefrom to a point immediately below the pipe 35. Attached to a ring 42 extending around the pipe 24 is a plurality of paddles 43, 43, these paddles extending radially from the pipe 24 and downwardly therefrom and also at an angle to the radii of the tower 10, and terminate at a point underneath the pipe 39, so that the entire cross sectional area of the tower 10 is covered by the paddles, which perform the function of beaters, breaking up the bubbles or surges of gas and also beating the water into a fine spray. The pipe 24 adjacent the ring 42 and immediately therebelow has a plurality of openings 44, 44 therein through which the water is thrown into the tower immediately adjacent the pipe 24.

The pipe 24 has a plurality of openings 45, 45 at the lower end thereof by means of which pipe 24 can be flushed, thereby removing the dirt which collects in the bottom of the pipe 24. A valve 46 is provided which is mounted upon a rod 47 the valve 46 having openings therein of the same diameter as the openings 45 in the pipe 24, by means of which the openings 45 are opened and closed as may be desired. In the normal operation of the device the openings 45 are closed by lifting the valve 46 on the rod 47 and clamping it in closed position by a pair of bolts 48 and 49, which extend through slots 50 and 51 in a plate 52, which is secured to a spider 53 mounted in the pipe 24 adjacent the T 22.

A second valve member 54 is provided which is mounted upon the lower end of a pipe 55 which extends upward and has a member 56 secured to the upper end thereof through which bolts 57 and 58 pass outwardly through the plate 52 through slotted openings provided in the plate so that adjustments of this valve may be made to control the flow of water through the openings 44 in the pipe 24.

Another valve 59 is provided which is secured to a pipe 60 extending longitudinally of the pipe 24 and having a member 61 mounted on the upper end thereof to which bolts 62 and 63 are secured which extend through slotted openings in the plate 52 and provide means for the adjustment of the valve 59 to control the flow of water into the spokes 40 of the circular pipe 39.

A valve member 64 is provided which is secured to a pipe 65 extending longitudinally of the pipe 24, and has a member 66 on the upper end thereof through which a pair of bolts 67 and 68 pass through slotted openings in the plate 52, by means of which the valve 64 is held in a plurality of adjusted positions thereby controlling the flow of water into the spokes 36, 36 leading to the pipe 35.

As shown, the pipe 60 is positioned inside of the pipe 65, with the pipe 55 inside the pipe 60 and the rod 47 passing longitudinally through the pipe 55, these pipes being nested together to provide means for adjustment of the valves which are of the usual piston type for controlling the quantity of water thrown from the pipe 24.

Secured to the inside of the shell is a circular plate 69 which is supported by an angle 70 and by a channel member 71 mounted upon an angle 72 secured to the side of the washer shell in any approved manner. The plate 69 extends downwardly from the shell 10 and has mounted thereon a plurality of spaced paddles 73, 73, these paddles being immediately above the paddles 38 mounted in the circular pipe 35 and terminating above the said pipe 35. These paddles 73 extend inwardly parallel to the radii of the gas washer tower and also project upward slightly or with respect to the horizontal plane of the tower 10 and parallel to the paddles 38. These paddles have a beating effect upon the gas as it is impinged against these paddles because of the rotary movement given to it by the paddles 38. The flow of gas continues upward because of the pressure from the column of gas passing through the tower.

Secured to the inner side of the shell 10 by vertically extending angles 74, 74 and angular disposed brace members 75, 75, is a plurality of radially disposed members 76, 76 at the inner ends of which a plurality of vertically extending members 77, 77 are positioned, to the ends of which a circular member 78 is secured in any approved manner, the member 78 being of angular formation and having an inwardly and downwardly projecting portion 79, to which a plurality of paddles 80, 80 are secured, these paddles projecting inwardly and terminating adjacent the pipe 24.

Intermediate the ends of the member 76 is provided a plurality of vertically extending members 81, 81 to which a circular angle member 82 is secured, this angle being immediately below the circular pipe 39 and has secured thereto a plurality of paddles 83, 83 which project inwardly parallel to the radii of the gas washer tower, and are above the paddles 41 and at an angle thereto and cooperate with the paddles 41 in the operation of the device for beating the portion of the gas which passes upward through the tower in the area traversed by the paddles 41 as the beater and spraying arrangement is rotated.

It will be thus understood from the foregoing description that gas passing upward through the gas washer tower is subjected to a scrubbing and beating by the paddles and the sprays of water which are thrown outward through the rotating arrangement which covers the entire cross sectional area of the gas washer tower and produces in this area a very fine mist, thus effectively washing the gas. The rotary paddles and sprays are arranged in three units, each unit covering a predetermined area of the gas washer tower. These units do not disturb the even distribution of the gas throughout the tower, but the rotary paddles impart to the gas a whirling motion only, which in effect is checked by the stationary paddles.

For the purpose of bringing the gas and water in close relationship in the lower portion of the tower and remove the coarser particles of dirt from the gas as it is introduced into the tower, I provide a series of splash plates and rings which are arranged in groups in the gas washer tower and which also serve the purpose of breaking up the surges or bubbles of gas, and also prevent channeling of the gas through the water. These splash plates and rings also cause the water to be evenly distributed throughout the tower and remove the coarser particles of dirt out of the gas. Immediately below the whirling and beating arrangement I provide a group of these splash plates and rings comprising a plate 84, the upper periphery of which is positioned adjacent the gas washer shell 10 and the lower edge of which is positioned inwardly therefrom, thereby providing a downwardly inclined surface over which water which is thrown against the gas washer shell 10 passes, thereby directing the flow of water into the effective cleaning area of the gas washer tower and also directing the upward flow of gas into the effective area of the cleaning and beating arrangement heretofore described.

Below the splash plate 84 is a splash ring 85 positioned in a horizontal plane in the gas washer shell and supported by a circular member 86 having a cross member 87 therein upon which the splash ring 85 is mounted. This member is in the form of an isoceles triagle in cross section with the apex pointing upward towards the plate 84. The lower marginal edge of the plate 84 is slightly outward from the apex of the ring 85, so that water falling from the edge of this plate falls to the outside of the ring 85. Spaced below the ring 85 is another ring 88 supported in the gas washer tower by circular angular member 89 and cross members 90 and 91, this member also being in the shape of an isoceles triangle in cross section with its apex pointing upward inside of the inner edge of the upper ring 85, so that water falling from the inner edge of the ring 85 falls on the outside of the ring 88.

Immediately below the ring 88 is a cone member 92 supported upon cross members 93 and 94, which in turn are supported upon an angle 95 secured to the side wall of the container 10, the apex of the cone 92 extending upward and directed to the center of the ring 88 so that any water passing downward from the inner edge of the ring 88 strikes against the sloping surface of the cone 92 and is directed outwardly from said cone.

Conversely the gas flowing upward through this group of splash plates and rings at the center thereof, strikes against the bottom of the cone 92 and is deflected outwardly and again strikes against the lower edge of the splash ring 88 and around which the gas passes in two directions, thence passing upward against the splash ring 85 around which the gas passes in two directions and thence through the plate 84 and is directed into the effective cleaning area of the beating and spraying arrangements heretofore described. By this system and arrangement of splash plates and rings neither the gas nor the water can pass through the washer in a straight line but must pursue a zigzag course, thereby preventing channeling of the gas and also effectively breaking up the bubbles or surges of gas and filling the tower with a fine spray or mist. An even distribution of the water is also maintained in the lower part of the tower.

Below the cone 95 is positioned another group of splash plates similar to the series heretofore described and which consists of a splash plate 96, a splash ring 97, with a smaller splash ring 98 and a cone 99, this series of splash rings being mounted in exactly the same manner as heretofore described with reference to the first mentioned series.

Another group comprising a splash plate and splash rings is also provided comprising a splash plate 99$^a$, triangular shaped rings 100 and 101 with a cone 102 mounted as lowermost of this series with a large splash plate 103 mounted adjacent and slightly below the cone 102 by means of which gas as it enters the gas washer is directed to the center of the gas washer tower and from which the streams of water passing downward to the bottom of the tower form a continuous sheet or stream of water through which gas must pass as it travels upward through the gas washer tower. It will also be understood that the gas which is dirtiest and at the bottom of the tower is brought into contact with the dirtiest water and as the gas proceeds through the tower the washing water carries with it less solid material than at the bottom of the tower so that at the top of the tower the cleanest water is brought into contact with the cleanest gas. The hottest gas also comes into contact with the hottest water, and the coolest gas with the coolest water, with the result that the gas has a low moisture content and also lower gas velocity.

In the operation of the device, gas is admitted through the inlet pipe 11 where it passes through the water flowing downward through the gas washer tower and from the lower end of the splash plate 103, and passes upward through the flowing sheets of water from the various splash plates and rings and comes in contact with the lower surfaces of the splash rings, thereby impinging against such surfaces the particles of dirt carried by the gas and passing upward through the various splash plates until it reaches the beater which is rotating at a very high rate of speed, preferably about 300 revolutions per minute, and which by reason of the rapid rotation of the arrangement and the flow of water from the pipes 35 and 39 and through the openings 44 forms an exceedingly dense spray in the upper part of the tower through which the gas must pass. The quantity of water flowing from the pipe 24 is regulated by the valves in the lower end of the pipe 24 so that enough water is supplied to this arrangement to form an exceedingly dense spray of very fine particles of water and as the gas passes through this spray it is beaten and brought into direct contact with the rotating paddles and also with the stationary paddles against which the particles of dirt are impinged, these surfaces being wet, causing the particles of dirt to adhere to them very closely and from which they are washed by a spray of water thrown against the surfaces. These valves also perform the function of supplying the proper quantity of water to each of the three spraying units so that the gas flow is kept uniform through the spraying and beating arrangement. The density of the spray in each of the units must be kept uniform or else the gas will flow through the unit having the least water and around the unit having the most dense spray. In this manner the fine particles of dust and dirt remaining in the gas are removed until I find in practical operation that the gas contains very little dirt and is cleaned to a much more thorough degree than has been heretofore possible with the stationary type of washer.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. A gas washer comprising in combination, a tower having a gas inlet and a gas outlet, a rotatable spray and beating arrangement mounted in said tower, and a series of splash rings mounted in said tower between the spray arrangement and the gas inlet, the said splash rings being arranged in concentric series in staggered relation with each other in said tower.

2. A gas washer comprising in combination, a tower having a gas inlet and a gas outlet, means for supplying water in the upper end of said tower, and a plurality of series of splash rings in said tower, each series comprising a plurality of concentrically arranged rings each of said rings being in spaced vertical relation with each other and in offset horizontal relation with each other, the said rings being triangular in cross sectional shape, having their apexes directed upward and their bases extending downward.

3. A gas washer comprising in combination, a tower having a gas inlet and a gas outlet, means for supplying water in the upper end of said tower, and a plurality of series of splash rings in said tower, each series comprising a plurality of concentrically arranged rings, each of said rings being in spaced vertical relation with each other and in offset horizontal relation with each other, each of said rings having sloping sides, the said rings being so arranged that water drains from the inner and outer edges of said rings whereby sheets of water are formed depending from each splash ring.

4. A gas washer comprising in combination, a tower having a gas inlet and a gas outlet, means for supplying water to the upper portion of said tower, a plurality of splash rings arranged in concentric relation with each other in said tower and in spaced vertical relation with each other, and splash plates mounted above each series of splash rings, adapted to direct the flow of water inward from the sides of the gas washer tower.

5. A gas washer comprising in combination, a tower having a gas inlet and a gas outlet, a rotatable water pipe mounted in said tower, a plurality of concentrically arranged spray pipes connected to said rotatable water pipe, paddles carried by said spray pipes and cooperating stationary paddles mounted in said gas washer tower in spaced relation with the paddles on said spray pipes.

6. A gas washer comprising in combination, a tower having a gas inlet and a gas outlet, a rotatably mounted water pipe in said tower, a plurality of concentrically arranged spray pipes in said tower, means connecting said spray pipes with said water pipe, paddles on said spray pipes in angular disposition to the radius of the gas washer tower, and stationary paddles mounted on said gas washer tower in spaced relation with said first mentioned paddles, the said paddles and spray arrangement covering the entire cross sectional area of the said tower.

7. A gas washer comprising in combination, a tower having a gas inlet and a gas outlet, a housing mounted in the upper end of said tower, a vertical water pipe rotatably mounted in said housing and projecting therebelow, a plurality of circular spray pipes connected to said water pipe paddles mounted on said spray pipes, spray nozzles mounted in said pipe projecting at an angle to the radii of the gas washer tower, and a plurality of sets of paddles mounted on said gas washer tower and adapted to cooperate with the paddles mounted on said water pipes.

8. A gas washer comprising in combination, a tower having a gas inlet and a gas outlet, a housing in said tower, a rotatable water pipe mounted in said housing, a plurality of spray pipes, hollow members connecting said water pipe and said spray pipes, and sets of paddles connected to said water spray pipes and the said water pipe, the said sets of paddles being arranged to cover substantially the entire cross sectional area of the said tower.

9. A gas washer comprising in combination, a tower having a gas inlet and a gas outlet, a housing in said tower, a rotatable water pipe mounted in said housing, a plurality of spray pipes, hollow members connecting said water pipe and said spray pipes, sets of paddles connected to said water spray pipes and the said water pipe, and valves in said water pipe adapted to control the water flowing therefrom.

10. A gas washer comprising in combination, a tower having a gas inlet and a gas outlet, a housing in said tower, a rotatable water pipe mounted in said housing, a plurality of spray pipes, hollow members connecting said water pipe and said spray pipes, sets of paddles connected to said water spray pipes and the said water pipe, and other paddles mounted in sets above said first mentioned sets of paddles, the said sets of paddles being arranged to cover substantially the entire cross sectional area of the said tower.

11. A gas washer, comprising in combination a tower having a gas inlet and a gas outlet, a housing, a rotatably mounted water pipe in said housing and extending into the gas washer tower, a plurality of circular spray pipes, pipes connecting said spray pipes with said rotatably mounted water pipes, paddles mounted on said spray pipes, and cooperating paddles adapted to cooperate with the paddles on said spray pipes and spaced therefrom.

12. A gas washer, comprising in combination a tower having a gas inlet and a gas outlet, a housing in said tower, a rotatably mounted water pipe in said housing extending out of said housing into said tower, a plurality of circular spray pipes, other pipes connecting said spray pipes with said water pipe, paddles mounted in the outer periphery of said spray pipes and extending outward therefrom, and cooperating paddles secured to the wall of the gas washer tower extending inwardly therefrom, the last mentioned paddles being mounted adjacent the path of the travel of the paddles on the said spray pipes.

13. A gas washer, comprising in combination, a tower having a gas inlet and a gas outlet, a housing in said tower, a rotatably mounted water pipe in said housing and extending into said tower, a plurality of circular spray pipes arranged in concentric relation with each other, paddles in the outer periphery of said spray pipes and extending outward therefrom, cooperating paddles mounted on said tower and extending inwardly therefrom, the last mentioned paddles being in sets to correspond with the paddles on said spray pipes, and means to control the flow of water from said water pipe into said spray pipes.

14. A gas washer, comprising in combination, a tower having a gas inlet and a gas outlet, a housing in said tower, a rotatably mounted water pipe in said housing and extending into said tower, a plurality of circular spray pipes arranged in concentric relation with each other, paddles in the outer periphery of said spray pipes and extending outward therefrom, cooperating paddles mounted on said tower and extending inwardly therefrom, the last mentioned paddles being in sets to correspond with the paddles on said spray pipes, and a plurality of valves to control the flow of water from said water pipe into said spray pipes.

15. A gas washer, comprising in combination, a tower having a gas inlet and a gas outlet, a plurality of series of splash rings in said tower, each series comprising a plurality of splash rings arranged in concentric relation with each other adapted to spread the water in two directions into curtain-like formations from the depending edges, a splash plate connected to the gas washer tower mounted above each series of splash rings, and means for supplying water to said gas washer tower.

Signed at Chicago, Illinois, this 3rd day of October, 1927.

HARRY A. STRAIN.